US012602733B2

(12) United States Patent
Shah et al.

(10) Patent No.: US 12,602,733 B2
(45) Date of Patent: Apr. 14, 2026

(54) AUTOMATED MACHINE LEARNING-BASED TOPIC TAGGING SYSTEM FOR EDUCATIONAL CONTENT CATEGORIZATION

(71) Applicant: Outschool, Inc., San Francisco, CA (US)

(72) Inventors: Parima Shah, San Diego, CA (US); Brindusa Manolache, Palo Alto, CA (US); Christoph Lee, Petaluma, CA (US); Axl Joshua Biol, San Diego, CA (US); Michael Brewer-Davis, Oak Park, IL (US)

(73) Assignee: Outschool, Inc., San Francisco, CA (US)

( * ) Notice: Subject to any disclaimer, the term of this patent is extended or adjusted under 35 U.S.C. 154(b) by 0 days.

(21) Appl. No.: 18/792,307

(22) Filed: Aug. 1, 2024

(65) Prior Publication Data

US 2026/0038068 A1      Feb. 5, 2026

(51) Int. Cl.
| | |
|---|---|
| *G06Q 50/20* | (2012.01) |
| *G06F 16/35* | (2019.01) |
| *G06F 40/284* | (2020.01) |

(52) U.S. Cl.
CPC ........... *G06Q 50/205* (2013.01); *G06F 16/35* (2019.01); *G06F 40/284* (2020.01)

(58) Field of Classification Search
CPC ...... G06Q 50/205; G06F 16/35; G06F 40/284
USPC ........................................................ 705/326
See application file for complete search history.

(56) References Cited

U.S. PATENT DOCUMENTS

| | | | | |
|---|---|---|---|---|
| 7,113,954 B2 * | 9/2006 | Vogel | ................... | G06F 16/367 |
| | | | | 707/777 |
| 8,751,256 B2 * | 6/2014 | Mansour | ................ | G16H 10/60 |
| | | | | 705/2 |
| 10,055,479 B2 * | 8/2018 | Clinchant | ............. | G06F 16/353 |
| 11,620,316 B1 * | 4/2023 | Asgekar | ................ | G06F 16/322 |
| | | | | 707/736 |
| 11,809,460 B1 * | 11/2023 | Rausch | ................. | G06F 40/284 |
| 11,907,672 B2 * | 2/2024 | Nugent | ................ | G06N 3/0499 |
| 12,387,144 B1 * | 8/2025 | Flinn | ........................ | G06F 40/30 |
| 2001/0049677 A1 * | 12/2001 | Talib | ...................... | G06F 16/951 |
| 2004/0024739 A1 * | 2/2004 | Copperman | .......... | G06F 16/367 |
| | | | | 707/E17.084 |
| 2005/0071362 A1 * | 3/2005 | Nelson | ................... | G06Q 10/06 |
| | | | | 707/999.102 |
| 2007/0016575 A1 * | 1/2007 | Hurst-Hiller | ......... | H04L 67/564 |
| | | | | 707/999.005 |
| 2009/0254540 A1 * | 10/2009 | Musgrove | ............. | G06F 16/951 |
| | | | | 707/999.005 |
| 2011/0196704 A1 * | 8/2011 | Mansour | ................ | G16H 10/60 |
| | | | | 707/723 |

(Continued)

*Primary Examiner* — Michael Tomaszewski
(74) *Attorney, Agent, or Firm* — Galvani Smith PLLC

(57) ABSTRACT

The present invention provides a machine learning-based system designed to automatically generate and associate classes or videos offered on an educational platform with topic tags. The machine learning-based system leverages both extractive and predictive topic tagging techniques: extractive tagging identifies relevant topics directly from content, while predictive tagging uses machine learning models trained on pre-tagged content to predict relevant topics for new content. This dual approach ensures both accuracy and comprehensiveness in tagging.

20 Claims, 7 Drawing Sheets

(56)            References Cited

U.S. PATENT DOCUMENTS

| | | | |
|---|---|---|---|
| 2012/0166414 A1* | 6/2012 | Decker | G06F 16/958 |
| | | | 707/738 |
| 2012/0197750 A1* | 8/2012 | Batra | G06Q 30/0631 |
| | | | 705/26.7 |
| 2012/0203752 A1* | 8/2012 | Ha-Thuc | G06F 16/35 |
| | | | 707/706 |
| 2013/0085745 A1* | 4/2013 | Koister | G06F 40/30 |
| | | | 704/9 |
| 2017/0039341 A1* | 2/2017 | Shklarski | G16H 50/70 |
| 2019/0130185 A1* | 5/2019 | Delaney | G06V 40/28 |
| 2019/0130299 A1* | 5/2019 | Jain | G06N 20/00 |
| 2019/0220537 A1* | 7/2019 | Kohlmeier | G06F 16/284 |
| 2019/0287415 A1* | 9/2019 | Zavesky | G09B 7/00 |
| 2020/0167421 A1* | 5/2020 | Mattivi | G06F 16/355 |
| 2020/0364610 A1* | 11/2020 | Sweeney | G06N 20/00 |
| 2021/0209500 A1* | 7/2021 | Hu | G06N 5/04 |
| 2021/0264116 A1* | 8/2021 | Thor | G06F 40/284 |
| 2022/0222437 A1* | 7/2022 | Lauber | G06N 3/0499 |
| 2023/0045354 A1* | 2/2023 | Farre Guiu | G06N 20/00 |
| 2023/0237082 A1* | 7/2023 | Asgekar | G06F 16/35 |
| | | | 707/736 |
| 2025/0299059 A1* | 9/2025 | Ahmed | G06N 3/045 |

* cited by examiner

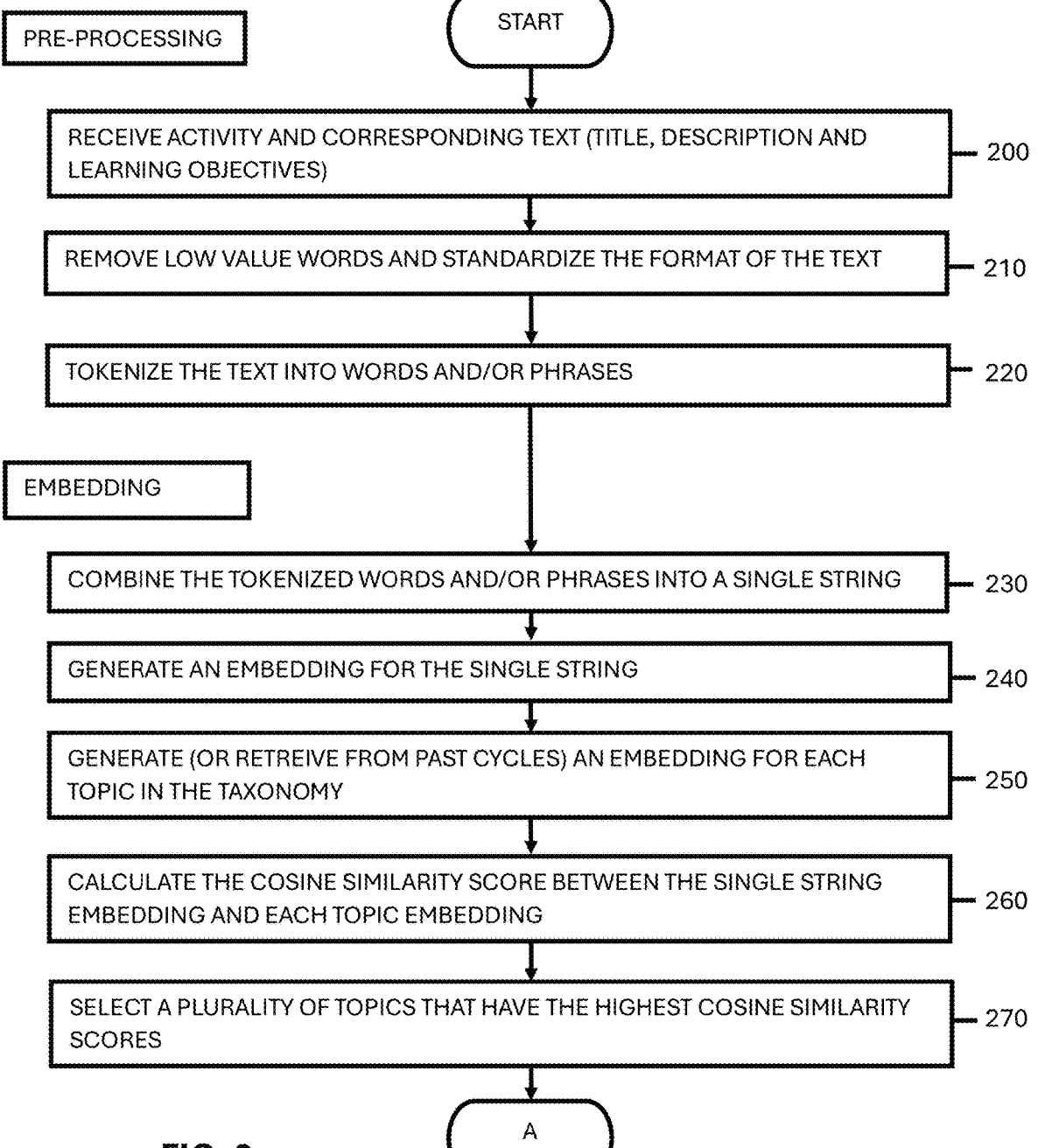

PRE-PROCESSING

START

RECEIVE ACTIVITY AND CORRESPONDING TEXT (TITLE, DESCRIPTION AND LEARNING OBJECTIVES) — 200

REMOVE LOW VALUE WORDS AND STANDARDIZE THE FORMAT OF THE TEXT — 210

TOKENIZE THE TEXT INTO WORDS AND/OR PHRASES — 220

EMBEDDING

COMBINE THE TOKENIZED WORDS AND/OR PHRASES INTO A SINGLE STRING — 230

GENERATE AN EMBEDDING FOR THE SINGLE STRING — 240

GENERATE (OR RETREIVE FROM PAST CYCLES) AN EMBEDDING FOR EACH TOPIC IN THE TAXONOMY — 250

CALCULATE THE COSINE SIMILARITY SCORE BETWEEN THE SINGLE STRING EMBEDDING AND EACH TOPIC EMBEDDING — 260

SELECT A PLURALITY OF TOPICS THAT HAVE THE HIGHEST COSINE SIMILARITY SCORES — 270

Best Fit Tagging

START

Submit Prompt to an AI Model (LLM) — 500

Define Possible Types of Attribute Tags (including Topic Tags) — 501

Focus on Topic Tags — 502

Provide Taxonomy to be Used — 503

Define Categories (including "best fit") — 504

Provide Directions on Applying Tags — 505

Provide Class Title — 506

Provide Class Summary — 507

Receive Best Fit Tag for Class from AI Model — 510

STOP

Secondary Topic Tagging

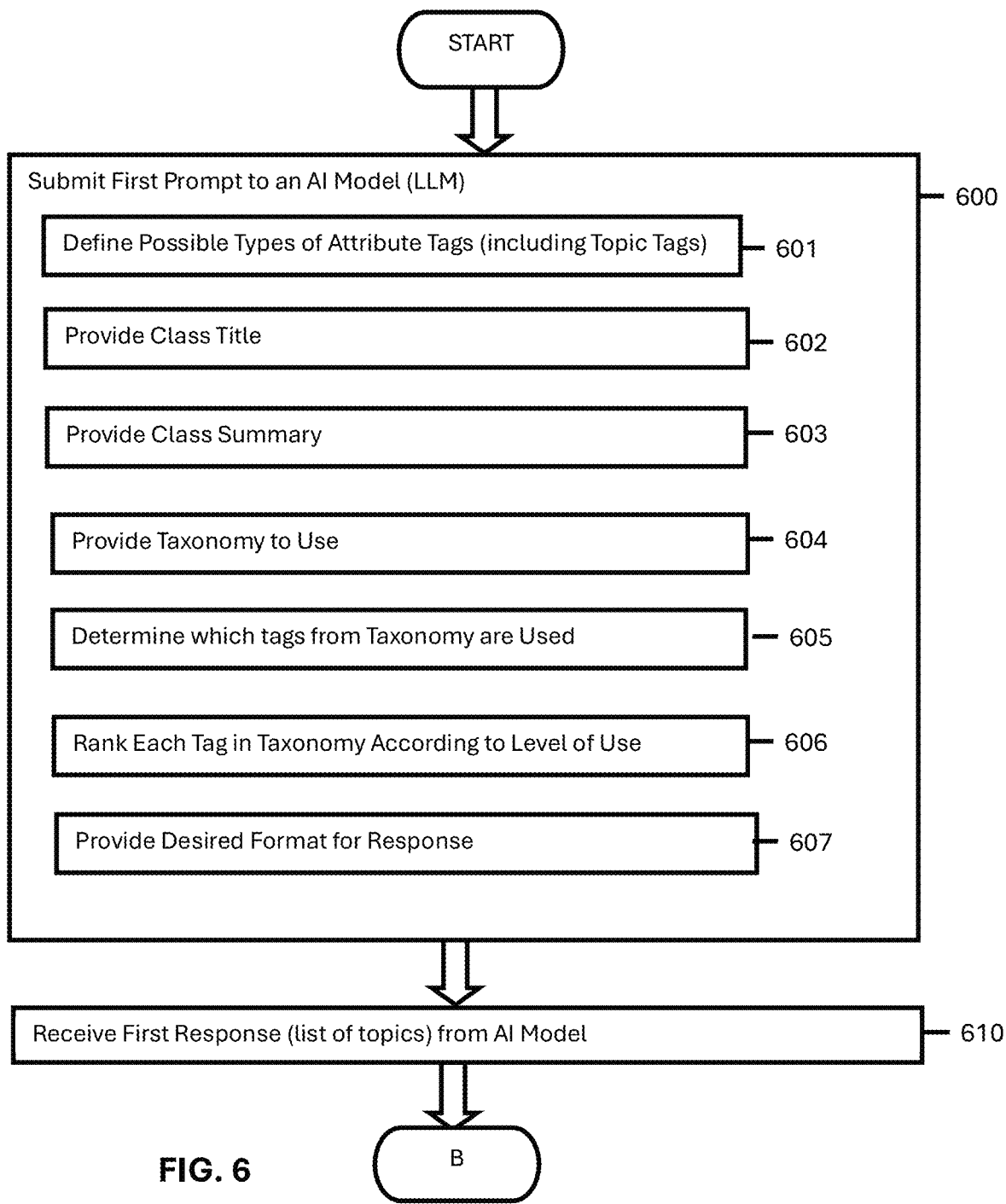

START

Submit First Prompt to an AI Model (LLM) — 600

Define Possible Types of Attribute Tags (including Topic Tags) — 601

Provide Class Title — 602

Provide Class Summary — 603

Provide Taxonomy to Use — 604

Determine which tags from Taxonomy are Used — 605

Rank Each Tag in Taxonomy According to Level of Use — 606

Provide Desired Format for Response — 607

Receive First Response (list of topics) from AI Model — 610

AUTOMATED MACHINE LEARNING-BASED TOPIC TAGGING SYSTEM FOR EDUCATIONAL CONTENT CATEGORIZATION

FIELD OF THE INVENTION

The present invention relates to an automated machine learning-based topic tagging system for educational content categorization. More specifically, the present invention enhanced discoverability and relevance of educational activities, such as classes or videos, through more accurate and standardized topic tags, which in turn improves the search and recommendation systems on an educational platform.

BACKGROUND

A taxonomy is a hierarchical classification system used to organize and categorize elements based on shared characteristics or relationships. Taxonomies are commonly used in various fields to structure data and concepts into a systematic arrangement. In essence, taxonomies provide a framework for understanding and organizing complex information by grouping similar things together and illustrating their relationships.

Topics or topic tags are metadata elements associated with a taxonomy that may be attached to digital content to facilitate searching and organization of that content. The topic tags serve as keywords or descriptors that identify the content's key characteristics, topics, or themes. For example, topic tags may be associated with online content such as articles, blog posts, images, videos, and documents. When users perform searches within a digital system or platform, the users can use the topic tags as search terms to quickly locate relevant content. Alternatively, in a set of search results, the topic tags can be presented to the user to provide shorthand summaries of the contents of the items identified in the search results. Searchable topic tags enhance discoverability and navigation, enabling users to efficiently find the information they are looking for amidst large volumes of digital data.

There have been past attempts at assigning topic tags to various elements, things or activities within a fixed taxonomy. As an example, humans have selected and applied topic tags to the various elements in a fixed taxonomy. However, this approach can be inconsistent as different content taggers may not apply the most accurate tags, leading to inconsistency and errors. Manually tagging a growing inventory of elements in a taxonomy is labor-intensive and not scalable without significant investment in human resources.

Another example of selecting topics from a fixed taxonomy to tag various elements is using an automated keyword-based systems (e.g., Elasticsearch). These systems use algorithms to automatically assign topic tags based on keyword matching (like term frequency-inverse document frequency (TF-IDF)). However, this system suffers from overgeneralization and imprecision. Such systems may incorrectly associate elements with general tags that only loosely fit the element. In addition, these systems are not always capable of adapting to new elements or changes in user engagement trends without manual intervention.

As yet another example of a failed attempt, the selecting and tagging of elements with topic tags may be performed by a specialist in the field. Encouraging specialists to tag elements they know has many of the same issues as using human labelers. Specifically, the specialists still have variability in tagging quality and unfamiliarity with optimal tagging practices, even though they have a great deal of knowledge regarding the element being tagged.

SUMMARY OF THE INVENTION

Accordingly, the invention is directed to an automated machine learning-based topic tagging system for educational content categorization. The invention enhances discoverability and relevance of educational activities, such as classes or videos, through more accurate and standardized topic tags, which in turn improves the search and recommendation systems on an educational platform.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the figures.

The invention includes a machine learning-based system designed to automatically generate topic tags for classes offered on an educational platform. It leverages both extractive and predictive topic tagging techniques: extractive tagging identifies relevant topics directly from content, while predictive tagging uses machine learning models trained on pre-tagged content to predict relevant topics for new content. This dual approach ensures both accuracy and comprehensiveness in tagging.

The advantages of this system include increased precision and standardization in the tagging process compared to previous manual or semi-automated methods, which were slower, less reliable, and less scalable. By automating the tagging process with advanced machine learning algorithms, an online educational institute can handle a larger taxonomy of topics efficiently, adapt quickly to new or evolving content, and improve the overall user experience by providing more relevant search results and recommendations. This system also supports enhanced personalization, using the topic tags to tailor the educational offerings to individual user preferences, which is crucial for customer retention and satisfaction.

The present invention may quickly generate high-quality topic labels for educational activities, such as class or videos. The system aims to rapidly produce accurate and relevant topic tags for various educational activities, which are essential for enhancing the search and discovery process within an educational platform.

The present invention may improve discoverability and relevance of searched for classes. By accurately tagging classes, the system helps in better categorization, making it easier for users (students, parents, teachers) to find classes that match their interests and educational needs.

The present invention may optimize the search experience. The invention is designed to refine search results, making them more relevant to user queries, thus improving user engagement and satisfaction.

The present invention may enable better insights and analytics. By standardizing topic labels, an online education institute may better analyze class popularity and user preferences, facilitating more informed business decisions and marketplace optimizations.

The present invention may increase efficiency and scalability by tagging activities with the optimum topic tag. The system reduces the reliance on manual labeling and allows for scalable operations as an online educational institution grows, i.e., adds new classes or course material.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serving to explain the principles of the invention.

In the drawings:

FIG. 2 is the first part of a flowchart illustrating an example method of practicing the invention.

FIGS. 6 and 7 are flowcharts for a secondary topic tagging method.

DETAILED DESCRIPTION OF THE ILLUSTRATED EMBODIMENTS

Figure 1:
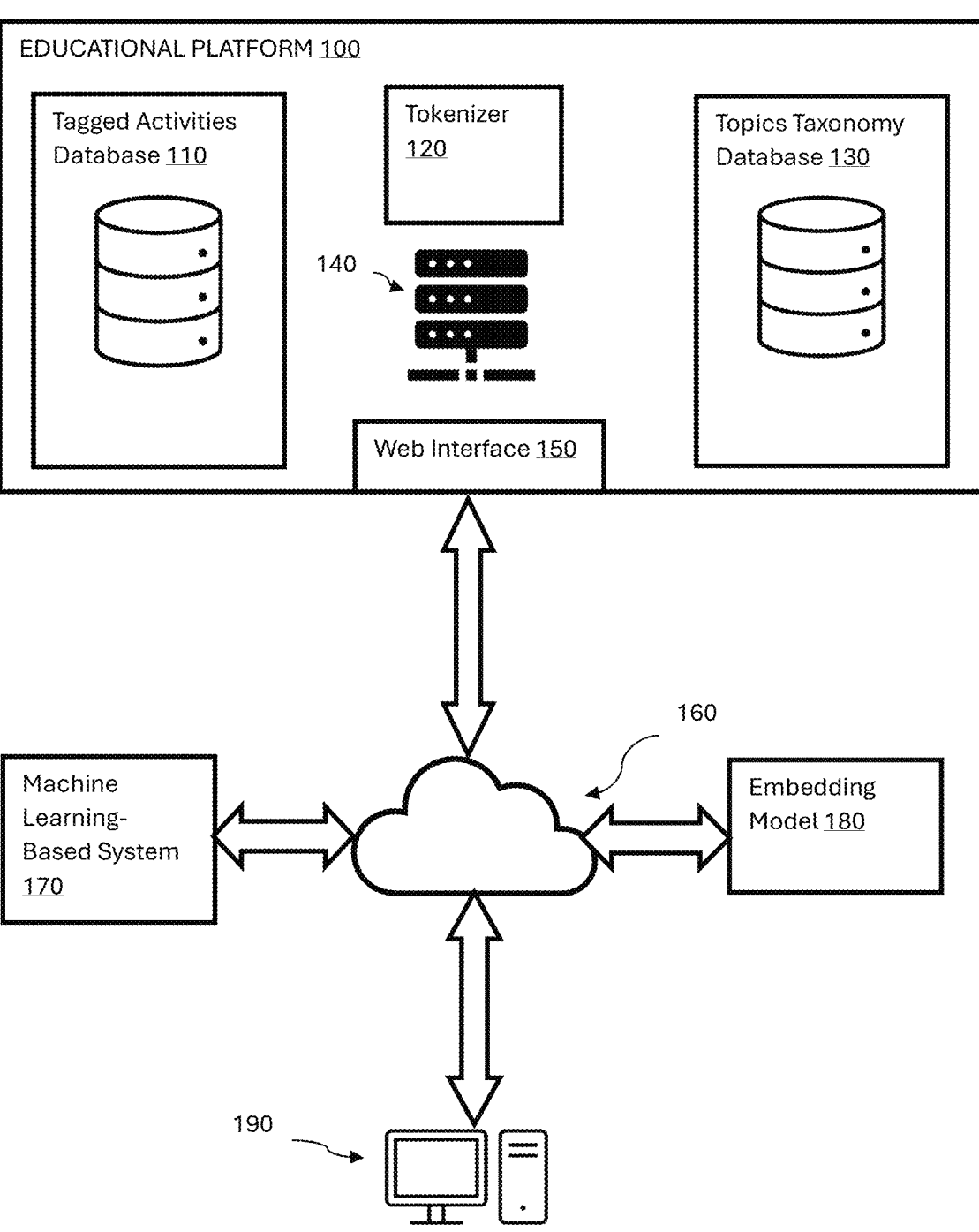
FIG. 1 is a diagram of an example system that may be used to practice the invention.

The following detailed description describes an automated machine learning-based topic tagging system for educational content categorization and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

For the purpose of promoting an understanding of the principles of the present disclosure, reference will now be made to the exemplary embodiments illustrated in the drawing(s), and specific language will be used to describe the same.

Appearances of the phrases an "embodiment," an "example," or similar language in this specification may, but do not necessarily, refer to the same embodiment, to different embodiments, or to one or more of the figures. The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps unless explicitly stated otherwise.

Referring to FIG. 1, an example of an automated machine learning-based topic tagging system for educational content categorization that may be used by an online educational institute is illustrated.

Online education is a method of learning that utilizes digital technologies and the internet 160. It enables students to access educational materials, participate in lectures, complete assignments, and interact with instructors and classmates entirely through an online educational platform 100 using user electronic devices 190, such as computers, laptops and smart phones. This mode of education can involve synchronous learning, where real-time interaction occurs through live video conferencing, and asynchronous learning, where students access pre-recorded lectures for classes and course materials, such as videos, at their own pace. Online education offers flexibility in scheduling, accessibility to a wide range of courses and instructors, and the ability for students to learn at their own pace. However, it also presents challenges such as the need for self-discipline and potential technical issues.

In the development of an online education platform 100, the hardware infrastructure to support that platform 100 includes many computer components working in conjunction to support delivery of educational content, facilitate interactive learning experiences, and ensure robust performance and reliability. The hardware elements for such an educational platform may include but are not limited to 1) one or more servers to execute and support core application logic, databases, and content repositories, 2) networking hardware to enable remote communication between devices, where such hardware may include routers, switches, and firewalls, and 3) data storage and retrieval systems, such as network-attached storage (NAS) or storage area networks (SAN), that provide scalable and fault-tolerant storage capacity for hosting educational content, multimedia files, and user-generated data.

To illustrate an example of such an infrastructure, as shown in FIG. 1, the educational platform 100 may include a tagged activities database 110 that includes a list of activities, such as a list of classes or a list of educational videos. Each activity in the database 110 may have one or more linked, associated or corresponding topic tags, i.e., keywords or topics, that assist in searching for a desired educational activity, e.g., a class or a video. As another example, the education platform 100 may also include a topics taxonomy database 130 that includes a taxonomy for education activities. The tagged activities database 110 and topics taxonomy database 130 may be part of the same database or be separate databases.

Example metadata and data within a topics taxonomy database 130 for educational classes may be:

| Name | Related Terms | Definition |
|---|---|---|
| Business | NA | |
| Business > Accounting | Auditing, Bookkeeping | Classes about accounting |
| Business > Legal | Compliance | Classes about business law |
| History | NA | |
| History > American | Revolution, Civil War | Classes about American history |
| History > European | Renaissance | Classes about European history |

Example metadata and data within a tagged activities database 110 for educational classes may be:

| Class Name | Topic Tag(s) |
|---|---|
| Business Accounting Essentials | Business > Accounting |
| European History Overview | History > European |

The educational platform 100 also includes a web interface 150. The web interface 150 may be a user interface that allows users to interact with web-based applications or websites through a graphical interface displayed in a web browser. The web interface 150 may consist of visual elements, such as menus, buttons, forms, and other interactive components, that users can interact with to perform actions or access information. The web interface presents content and functionality in a structured and accessible manner, enabling users to navigate, input data, and interact with the underlying system or application. It may incorporate various design principles, such as responsiveness, accessibility, and usability, to ensure a seamless and intuitive user experience across different devices and platforms.

The education platform 100 also includes a tokenizer 120 or the educational platform 100 may access a tokenizer 120 over the internet 160. A tokenizer 120 may be a component of a text processing system designed to segment input text into smaller units known as tokens. Tokenizers are typically implemented as a software module or algorithm that operates on textual data, breaking that data down into meaningful units such as words, phrases, or punctuation marks.

The educational platform 100 may include a machine learning-based system 170 or the education platform 100 may access a machine learning-based system 170 over the internet 160. A machine learning-based system 170 is a computational framework that utilizes algorithms and techniques to perform tasks or make decisions without explicit programming instructions. Instead of being explicitly programmed for specific tasks, these systems learn from input training data to identify patterns and relationships amongst any input data, thereby improving their performance over time.

The machine learning-based system 170, may be of any desired type. As non-limiting examples, the machine learning-based system 170 may be an Artificial Intelligence (AI) Model or a Generative Pre-trained Transformer (GPT) model. The machine learning-based system 170 (whether of the AI model or GPT model type) relies on hardware capable of handling intensive computational tasks. Machine learning-based system may include a Central Processing Unit (CPU), a Graphics Processing Unit (GPU) or a Tensor Processing Unit (TPU). GPUs and TPUs are particularly useful in machine learning-base systems 170 as they reduce the amount of training times needed by the machine learning-based systems 170 that use neural networks.

The educational platform 100 may include an embedding model 180 or the education platform 100 may access an embedding model 180 over the internet 160. Embedding may refer to a numerical representation of words, phrases, or sentences in a continuous vector space. This representation captures semantic and syntactic similarities between textual elements, facilitating computational tasks such as word similarity measurement, text classification, and language understanding. An embedding model may be a computational model trained to generate embeddings by learning meaningful patterns and relationships from input textual data. Embedding models may include software, a processing unit (either a CPU/GPU or TPU) and a neural network architecture.

A cosine similarity score is a metric that may be used to measure the similarity between two vectors in a multi-dimensional space. It calculates the cosine of the angle between the vectors, indicating how closely they align in direction. A cosine similarity score may be used to compare the similarity between two texts represented as vector embeddings. Each text may be represented as a vector in a high-dimensional space, with each dimension corresponding to a feature or term frequency.

To calculate the cosine similarity score between two text vectors, the cosine of the angle between the vectors may be computed using the dot product of the vectors and their magnitudes. The resulting score may range from −1 to 1, where a score of 1 indicates perfect similarity, a score of 0 indicates no similarity, and a score of −1 indicates perfect dissimilarity.

The cosine similarity score may be calculated using any desired hardware. In a preferred embodiment, the educational platform 100 may include one or more servers 140 that may be used to calculate the cosine similarity scores as needed in performing various embodiments of the invention.

An educational platform 100 may function as a topic tagging system that may be used to categorize and label content or data based on specific topics or themes. A topic tagging system may assign descriptive keywords or topic tags to individual pieces of digital text to facilitate organization, search, and retrieval.

Extractive topic tagging may involve automatically identifying and extracting key topics or themes from a piece of text without modifying or paraphrasing the original content. This process may involve analyzing the text to identify significant words, phrases, or patterns that represent the main ideas or subjects discussed. Extractive topic tagging systems may use various techniques, such as natural language processing algorithms, statistical analysis, or machine learning models, to identify and extract relevant topics from the text. The extracted topics may then be used to assign descriptive keywords or topic tags to the text, making it easier to categorize, search, and retrieve related content.

Predictive topic tagging may involve using machine learning algorithms to predict or assign relevant topics or themes to a piece of text automatically. In this process, the algorithm analyzes the content of the text and predicts the topics it covers based on patterns, similarities, and relationships found within the text itself or in a larger corpus of labeled data. The predictive model may learn from examples of labeled text data, where each piece of text is associated with one or more predefined topics or themes. Through this training process, the model may learn to recognize patterns and features indicative of specific topics and can then apply this knowledge to new, unseen text to predict relevant topics which then may be used as a topic tag assigned or linked to the text.

An embodiment of the invention may be a machine learning-based system designed to automatically generate topic tags for classes offered on educational platform 100 that leverages one or both extractive and predictive topic tagging techniques. This embodiment improves the accuracy and comprehensiveness in tagging.

As examples of topic tagging, if a title is "Puppy Potty Training" and a summary is "Steps to successful puppy potty training and the truth about what it takes and what never to do to your puppy." a best fit topic or topic tag may be "Life Skills>Petsitting & Training."

As another example of topic tagging, if a title is "Math Doodles: Area" and a summary is "Students will learn to calculate the area of rectangles and triangles through doodles." a best fit topic or topic tag may be "Math>Geometry."

As another example of topic tagging, if a title is "Extreme Animals: Super Senses" and a summary is "Infrared vision, echolocation, electroreception and numerous other adaptations of the senses used everywhere from the deep sea by whales and sharks to the darkness of night by pit vipers and bats. Learn how these animals sense their world!" a best fit topic or topic tag may be "Science>Animals & Zoology."

As another example of topic tagging, if a title is "All About the Piranha. A Toothed and Ferocious Fish Who Loves to Eat." and the summary is "In this one time class, learners will learn fascinating facts about the piranha, its habits, habitat and unique characteristics that make him special." a best fit topic or topic tag may be "Science>Animals & Zoology>Fish."

As another example of topic tagging, if a title is "How the U.S. Presidential Election Works" and the summary is "In this one time class, learners will be introduced to how the United States elects its President." a best fit topic or topic tag may be "Social Studies>Government & Civics."

The best fit topic or topic tags preferably have the form of the highest level (level 1) taxonomy topic followed by the second highest level (level 2) of taxonomy topic and so. The topics and topic tags may use any number of levels in the taxonomy as desired, such as one level, two levels, three levels or a plurality of levels.

Figure 3:
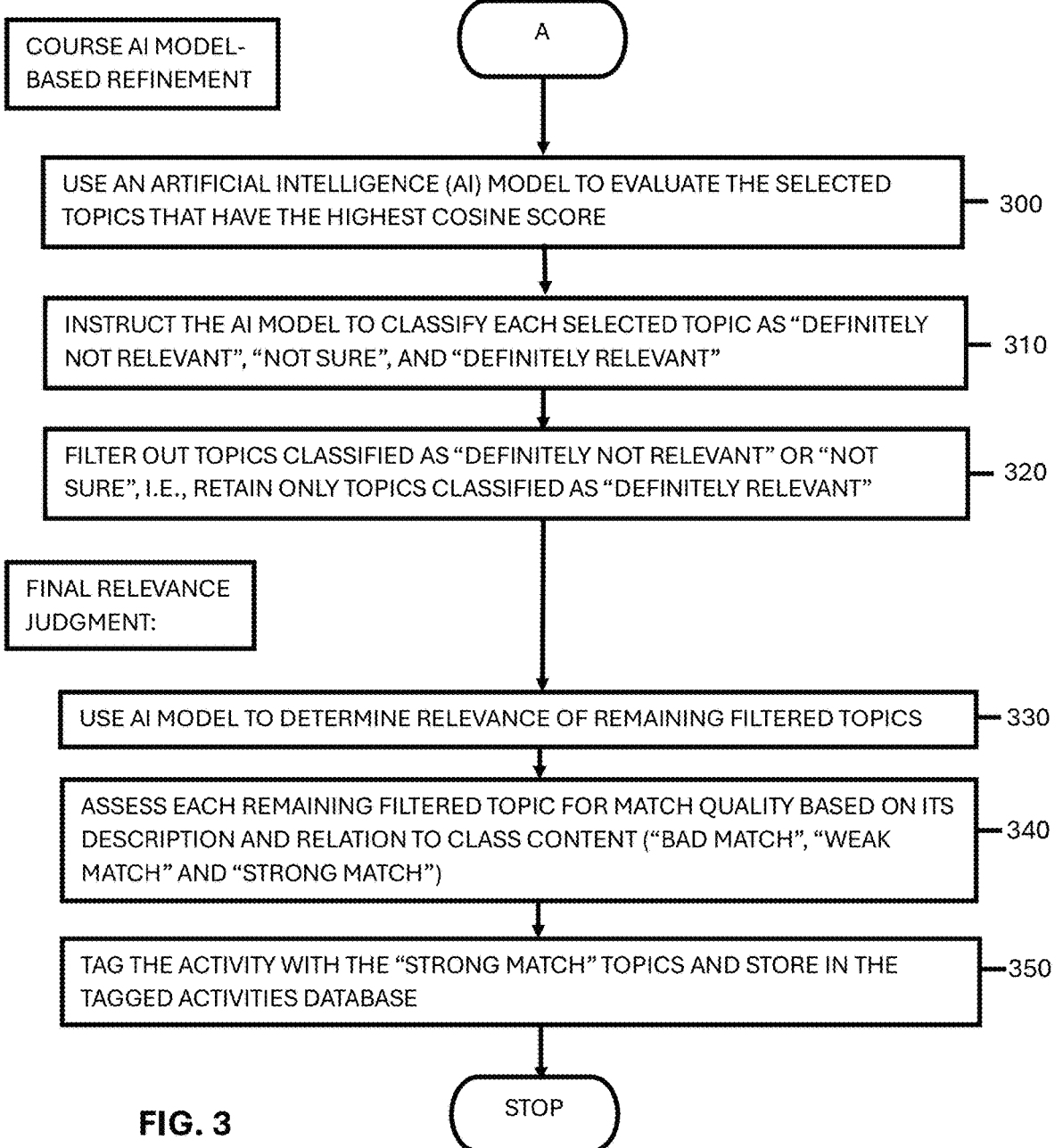
FIG. 3 is the second part of the flowchart in FIG. 2 illustrating the example method for practicing the invention.

Referring to FIGS. 2 and 3, an example method will now be provided for using an automated machine learning-based topic tagging system for educational content categorization. The example method may include the step of selecting one or more tags for an educational activity. The method may start by the web interface 150 of the educational platform 100 receiving a text that corresponds to the educational activity. The text may be provided by the person that created the content or that wants to add the content to the tagged activities database 110. (Step 200) The text may be any desired text that describes the educational activity. As a non-limiting example, if the educational activity is a class, the text may include one or more of a title of the course, a summary of the course, a course description and/or the learning objectives of the course. If the educational activity is an educational video, the person supplying the video may also supply text that includes one or more of the title of the video, a summary of the video, a video description and/or learning objectives of the video. In another embodiment, the text for the video may be determined by the educational platform 100 reviewing the audio of the video (and possibly the video itself) and determine an appropriate text for the video. The educational platform 100 may transcribe the audio into the words/sentences of the video. The words and sentences from the video may be treated as the received text for the video.

One or more servers 140 may remove low value words from the text. Removing low-value words from a text involves eliminating words that are deemed less relevant or informative in the context of the text's content or analysis. These words are typically common, generic, or stop words that do not carry significant meaning or contribute to the understanding of the text's main topics or themes. By filtering out low-value words, the focus can be directed towards more meaningful and informative terms, thereby enhancing the accuracy and effectiveness of the analysis results. Examples of low-value words that may be removed include articles (e.g., "a," "an," "the"), conjunctions (e.g., "and," "but," "or"), prepositions (e.g., "in," "on," "at"), and other frequently occurring words that do not carry specific semantic or contextual information.

The one or more servers 140 may standardize the text into a desired format. (Step 210) Standardizing a text to a desired format may involve ensuring that the text conforms to a predefined structure or style according to specific guidelines or requirements. This process aims to make the text consistent and uniform in its presentation, organization, or representation. In standardizing the text, various adjustments or transformations may be applied, depending on the desired format and the characteristics of the text. This could include formatting the text elements consistently, normalizing variations such as punctuation and capitalization, breaking down the text into smaller units for analysis, and removing unnecessary elements like stop words.

A tokenizer 120 may be used to tokenize the text into one or more words, phrases and/or sentences. (Step 220) Tokenizing breaks down the text into smaller units, which are usually words, phrases or sentences, called tokens. The purpose of tokenizing the text is to transform the text into a format that can be easily processed and analyzed.

The one or more servers 140 may combine the tokenized words, phrases and/or sentences into a single string. (Step 230) Concatenating the tokenized words, phrases and/or sentences into a single string involves combining the individual tokens back together to form a unified text representation. This process reverses the tokenization step, allowing the segmented units of text to be reconstructed into their original sequence, but without the low value words. By concatenating the tokenized words, phrases and/or sentences into a single string, the text can be represented as a continuous sequence of characters, making it easier to process, analyze, and manipulate as a whole.

An embedding model 180 may be used to generate an embedding for the single string. (Step 240) Additionally, the embedding model 180 may generate an embedding for each topic in a taxonomy. (Step 250) Once calculated, the embeddings for the topics in the taxonomy may be saved in the topics taxonomy database 130 to increase the speed of future iterations of the process.

The embedding is a numerical representation of the single string in a continuous vector space. In simpler terms, embedding is a way to represent words, phrases and/or sentences as vectors of real numbers. These vectors capture semantic relationships and contextual information about the text, allowing the machine learning models to understand and process the single string more effectively.

The one or more servers 140 may calculate a similarity score between the embedding for the single string and the embedding for each topic in the taxonomy. (Step 260) In preferred embodiments, the similarity score is a cosine similarity score. To calculate the cosine similarity score between two text vectors, the cosine of the angle between the vectors may be computed using the dot product of the vectors and their magnitudes. The resulting score may range from −1 to 1, where a score of 1 indicates perfect similarity, a score of 0 indicates no similarity, and a score of −1 indicates perfect dissimilarity.

The one or more servers 140 may select a plurality of topics in the topics taxonomy database that have the highest similarity scores with the single string. (Step 270)

A machine learning-based system 170, such as an AI model or a GPT may be used to classify each topic in the selected plurality of topics as having no relevance, a medium amount of relevance or a high relevance. In another embodiment, each topic may be classified as having a "Definitely Not Relevant", "Not Sure", and "Definitely Relevant" level of relevance. (Step 300, 310)

The one or more servers 140 may retain the classified topics that are determined to be "Definitely Relevant". (Step 320)

The machine learning-based system 170, such as the AI model or the GPT, may classify each of the retained topics as having a low match, medium match or high match. In other embodiments, each topic may be classified as having a "Bad Match", a "Weak Match" and a "Strong Match" based on at least part of the text and relation to the educational activity. (Step 330, 340)

The educational platform 100 using the one or more servers 140 may apply the retained topics classified as "Strong Match" as the one or more topic tags for the educational activity. (Step 350) The educational activity and the "Strong Match" topic tag(s) may be stored together in the tagged activities database 100 to make it easier to search for and find the educational activity, which may as non-limiting examples a class or a video.

Figure 4:
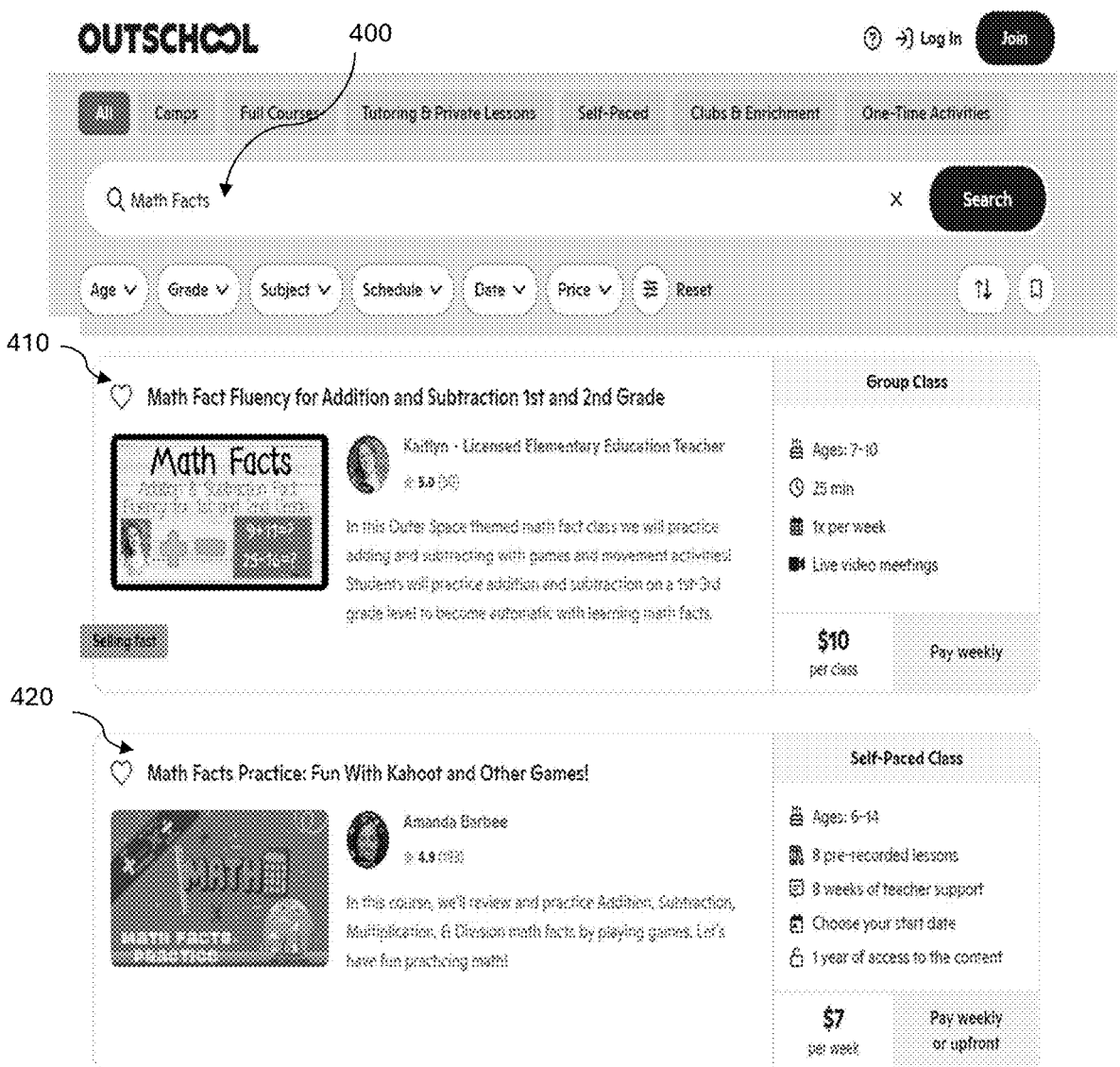
FIG. 4 is a screen shot of a web page that may be used to receive a search request and display appropriate content to the user.

Referring to FIG. 4, a user (such as a student, parent, guardian, or teacher) using their own electronic device 190 may enter a search query into a search field 400. In FIG. 4, the search query is the phrase (or keywords) "Math Facts." The educational platform may use the search query to identify one or more activities in the tagged activities database 110. In FIG. 4, the classes "Math Fact Fluency for Addition and Subtraction 1$^{st}$ and 2$^{nd}$ Grade" and "Math Facts Practice: Fun With Kahoot and Other Games!" are displayed to the user on the user's electronic devices 190 for their information and possible purchase selection.

The educational platform 100 may deliver the selected, and possibly paid for, content to the student through any desired medium. As non-limiting examples, the selected/paid for content may be streamed (either a live presentation or a recording) from the educational platform 100 (or an affiliated platform) to a student's electronic device 190, the content may be physically delivered via a storage format (such as a thumb drive or a DVD) that may be accessed by the student's electronic device 190, the selected/paid for content may be delivered through a live class that the student physically attends or the content may be delivered by another, possibly affiliated, online educational platform.

Figure 5:
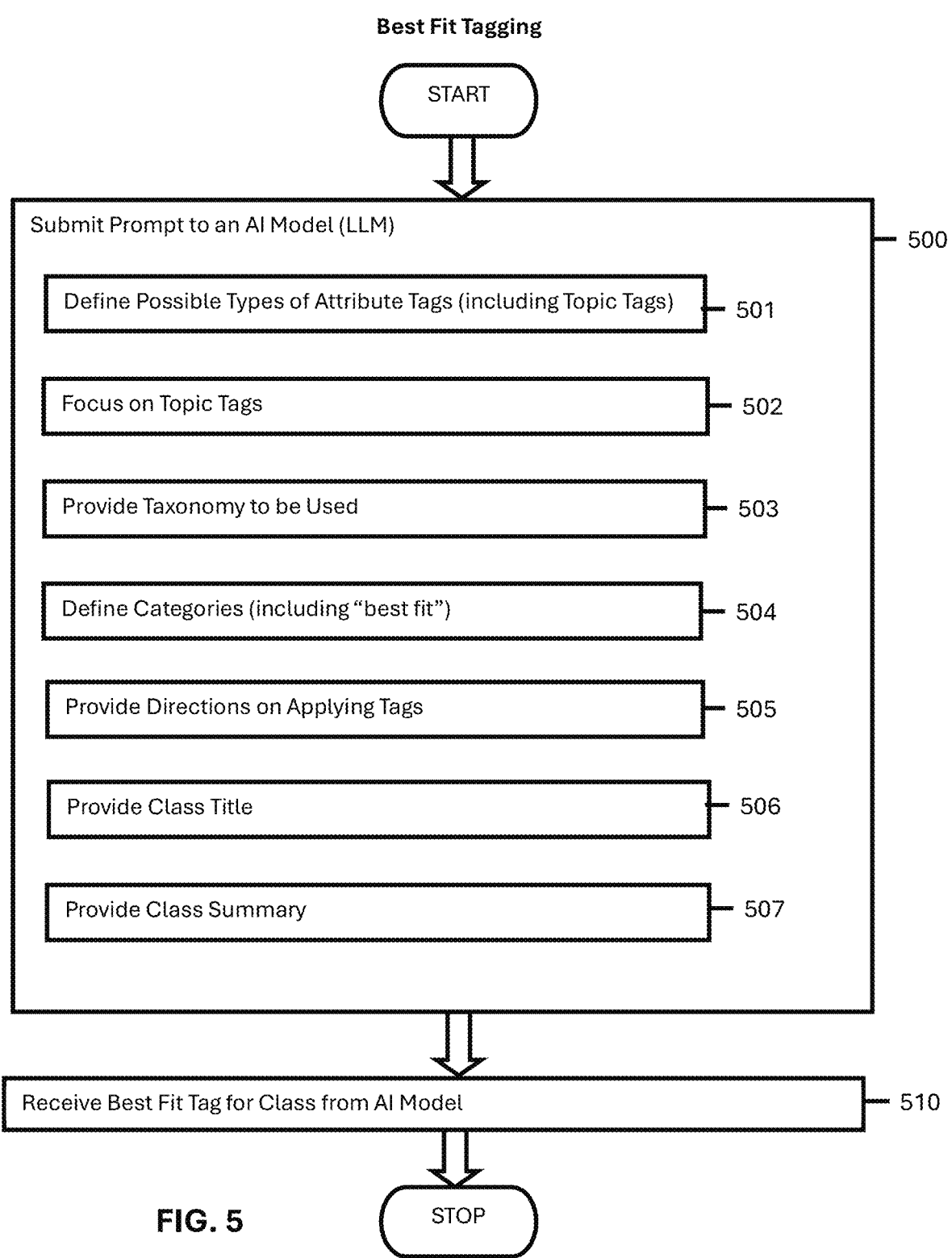
FIG. 5 is a flowchart for a best fit tagging method.

FIG. 5 is a flowchart for a best fit tagging method in which, for a particular piece of educational content, a best-fit content tag is identified. In this method one, and only one, prompt is submitted to a Machine Learning Based System 170 for each class. (Step 500) As a non-limiting example, the Machine Learning Based System 170 may be an AI model, such as a version of ChatGPT. The prompt to the AI model may comprise various instructions and/or various data or processing constraints to be used when the instructions are executed by the AI model. The sequence of the instructions and data in the prompt are preferably presented in a logical order so that the instructions and the data to be used with the instructions are presented sequentially in the prompt. In some embodiments, the prompt may begin with a context of the problem. As a non-limiting example, the prompt may begin with "Classes on an educational platform can have attribute tags."

The prompt may further define types of attribute tags that may be used for classes. (Step 501) As a non-limiting example, the prompt may include "There are several different types of attributes that classes can be tagged with, including:

Topics
Instruction Style
Learner Needs
Learner Age or Grade Level
Learner Proficiency or Skill Level
Learning Goals
Teacher Certifications
Curriculum Type.
These attribute tags can be used in search to better retrieve and rank classes."

The prompt may let the AI model know to focus on the "Topics" attributes. (Step 502). As a non-limiting example, the prompt may include "In this exercise, you will be solely focused on topic tags. All other types of tags must be ignored." In this manner the type of analysis performed by the AI model may be constrained.

The prompt may further inform the AI model the data in the taxonomy that is to be used. (Step 503) As a non-limiting example, the prompt may include "Here is the taxonomy to use: <List of Top N topics from taxonomy here>"

The prompt may include categories to assign to the topics in the taxonomy. (Step 504) As a non-limiting example, the prompt may include "Use the following structure to identify the best topic for the provided class:

best_topic_ideal: the best fit topic, whether or not it is in the taxonomy
topic_ideal: any additional relevant topics beyond the best fit topic, whether or not they are in the taxonomy
best_topic: the best fit topic from the taxonomy
topic: any additional relevant topics from the taxonomy (beyond the best fit topic)"

The prompt may include further instructions regarding how to apply tags, such as by describing or defining attributes of topics. (Step 5050) As a non-limiting example, the prompt may include "Note about applying tags:

Topics should convey the main focus of the learning experience, whether that is a subject of instruction, activity, or other type of focus.
Having a topic applied indicates that the class is maximally relevant to the topic, and would be suitable as the top search result for the topic (based on query relevance alone).
There should be an exact semantic match between the activity title or summary and the topic in order for a topic to be applied.
There should be an intuitive relationship between the activity title and all applied topics.
Do not apply parent topics if child topics have been applied."

The prompt may include a class title for the class being tagged. (Step 506) As a non-limiting example, the prompt may include "Class title: <Class title here>"

The prompt may include a class summary for the class being tagged. (Step 507) As a non-limiting example, the prompt may include "Class summary: <Class summary here>"

The prompt as described above may be sent to an AI model and the AI model, using methods previously discussed, may return a best fit topic tag for a particular piece of educational content. (Step 510) The education platform 100 may then store the class and the best fit topic tag in the response from the AI model in a tagged activities database 110. While a class was used as an example, other educational activities, such as videos, field trips, assignments, etc. may also be tagged using the above described method.

Figure 7:
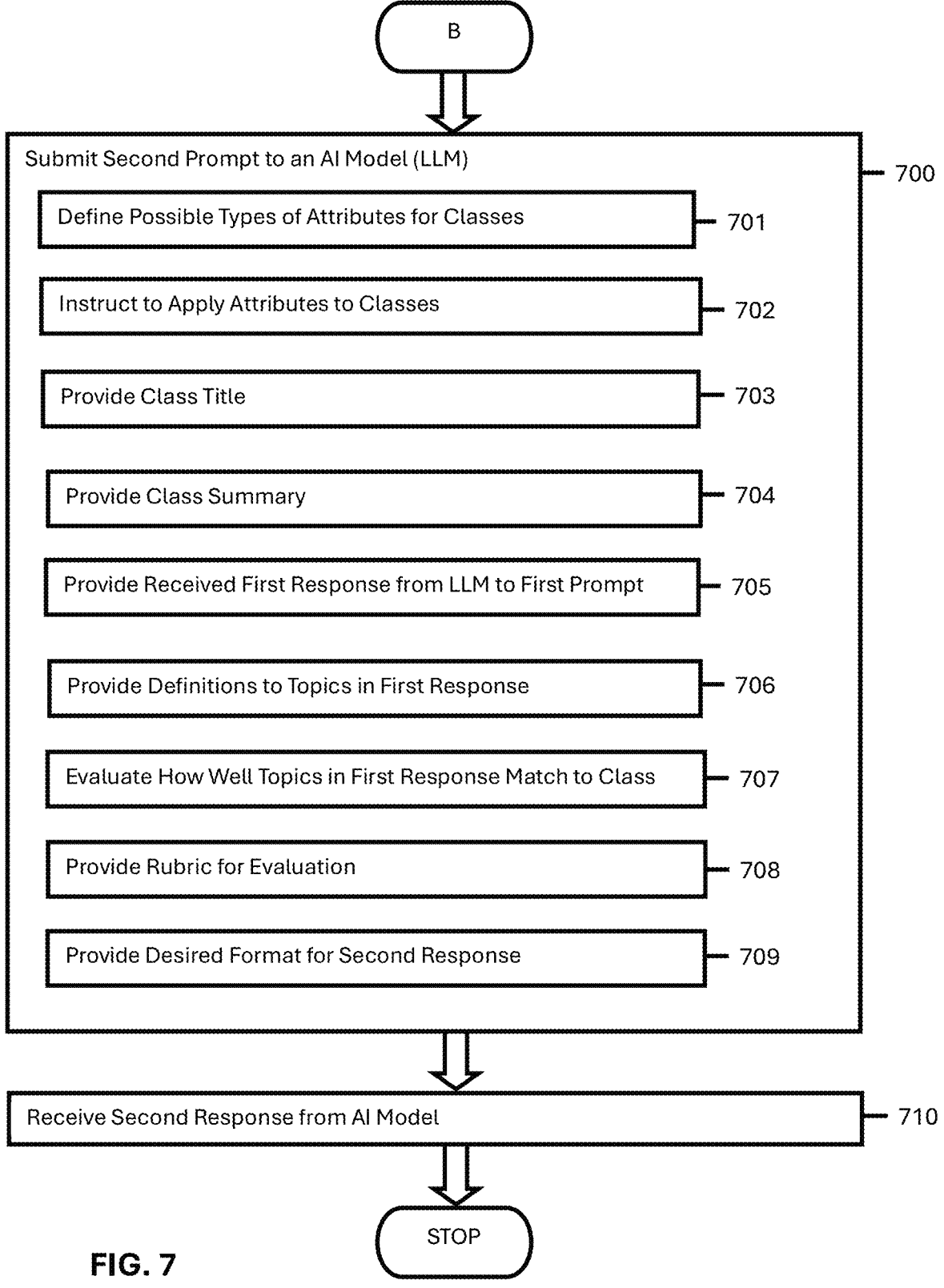

FIGS. 6 and 7 are flowcharts for a secondary topic tagging method. In this method two, and only two, prompts (a first prompt and a second prompt) are submitted to a Machine Learning Based System 170 for each class. (Step 500) As a non-limiting example, the Machine Learning Based System 170 may be an AI model, such as a version of ChatGPT. The prompt to the AI model may comprise various instructions and various data to be used when performing the instructions. The sequence of the instructions and data in the prompt are preferably presented in a logical order so that the instructions and the data to be used with the instructions are presented sequentially in the prompt. In some embodiments, the prompt may begin with a context of the problem. As a non-limiting example, the prompt may begin with "You are an expert on educational content for an educational platform, which provides online classes for kids aged 3-18."

The first prompt may include a definition of possible types of attribute tags with the instruction to focus on applying attribute tags to classes. (Step 601) As a non-limiting example, the first prompt may include "Classes on the educational platform can be tagged with various attributes, including topics, themes, teaching style, learner needs, grade level, skill level, and more. In this exercise you will be focused on applying attribute tags to classes."

The first prompt may include a class title of the class being tagged. (Step 602) As a non-limiting example, the first prompt may include "Class title: <Class title here>".

The prompt may include a class summary of the class being tagged. (Step 603) As a non-limiting example, the prompt may include "Class Summary: <Class summary here>".

The first prompt may include a data of a taxonomy being used to tag the class. (Step 604) As a non-limiting example, the first prompt may include "Partial topic taxonomy: <List of top N topics from taxonomy here>".

The first prompt may include instructions to determine which tags from the taxonomy are used. (Step 605) As a non-limiting example, the first prompt may include "Given the class title, class summary, and partial taxonomy above, determine which tags from the taxonomy are represented or explicitly mentioned in the class."

The first prompt may include instructions to rank each tag in the taxonomy according to the level of use for the class. (Step 606) As a non-limiting example, the first prompt may include "Using a bulleted list, for each topic in the taxonomy, indicate whether it is represented in the class using the following rubric:

1—Definitely Not: It is not mentioned and is not relevant
2—Not Sure: It is mentioned or implied, but it might not be highly relevant
3—Definitely Yes: It is clearly mentioned or implied and is definitely relevant."

The first prompt may include instructions regarding the format of a first response. (Step 607).

The first prompt may then be submitted to the AI model (Step 600) and a first response may be received from the AI model that is in response to the first prompt (Step 610).

A second prompt may then be created for the AI model. The second prompt may include possible types of attributes for classes (Step 701) with an instruction to apply the attributes to the classes (Step 702) As a non-limiting example, the second prompt may include:

"You are an expert on educational content for an educational platform, which provides online classes for kids age 3-18.

Classes on the educational platform can be tagged with various attributes, including topics, themes, teaching style, learner needs, grade level, skill level, and more.

In this exercise you will be focused on applying attribute tags to classes."

The second prompt may include a class title. (Step 703) As a non-limiting example, the second prompt may include "Class title: <Class title here>"

The second prompt may include a class summary. (Step 704) As a non-limiting example, the second prompt may include "Class Summary: <Class summary here>"

The second prompt may include the first response to the first prompt. (Step 705) As a non-limiting example, the second prompt may include "The following topics have been applied to this class by a rudimentary tagging system:

Topic Name: Topic Description
<List of topics chosen in part 1 with (optional) descriptions to provide more context>"

The second prompt may include definitions to topics in the first response. (Step 706)

The second prompt may include instructions to evaluate how well topics in the first response match to the class (Step 707) along with a rubric to use in the evaluation. (Step 708) As a non-limiting example, the second prompt may include "Question: For each topic applied, evaluate how well the topic matches the class using the following rubric:

Bad match: the topic is not relevant to the class.
Weak match: the topic is implied or relevant, but it represents only a small part of the class or is only tangentially related. In a list of search results for this topic, this class is acceptable but certainly not the best result.
Strong match: the topic is a strong match for the class. In a list of search results for this topic, this class would be a great result."

The second prompt may provide a desired format for the second response. (Step 709). Example formatting, for example, may specify that the second response should be formatted as a JavaScript object notation (JSON) object that includes specific data elements, such as topic name and grade level.

The educational platform 100 may submit the second prompt to the AI model (Step 700) and, in response to the second prompt, receive a second response from the AI model (Step 710) The education platform 100 may then store the class and topic tag(s) in the second response in a tagged activities database 110. While a class was used as an example, other educational activities, such as videos, field trips, assignments, etc. may also be tagged using the above described method.

It should be appreciated that the tagged activities database 110 may be used for any desired educational activity. As non-limiting examples the tagged activities database 110 may be used to tag and later find classes or videos. It should also be appreciated that the educational platform 100 may tag any desired number of educational activities. As non-limiting examples, the educational platform 100 may have a first tagged activities database used for classes and a second tagged activities database used for videos, which may be stored on the same database hardware or different database hardware.

The inventions and methods described herein can be viewed as a whole, or as a number of separate inventions, that can be used independently or mixed and matched as desired. All inventions, steps, processed, devices, and methods described herein can be mixed and matched as desired. All previously described features, functions, or inventions described herein or by reference may be mixed and matched as desired.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An online education platform for tagging and storing activities, comprising:

a tagged activities database comprising a plurality of activities with each activity tagged with one or more topics;

a topics taxonomy database that stores a taxonomy of topics;

one or more servers configured to remove low value words from a text, standardize the text into a desired format, combine words and/or phrases into a single string, calculate a similarity score between an embedding for the single string and an embedding for each topic in the taxonomy, select a plurality of topics in the topics taxonomy database with the highest similarity score, retain classified topics determined to have a high level of relevance, and tag an activity with each of the retained classified topics classified as having a strong match;

a tokenizer configured to tokenize the text into the words and/or phrases; and a web interface:

configured to interface with web devices of a plurality of users and receive the activity and the text from one of the plurality of users, configured to interface with an embedding model to determine a first embedding for the single string in the embedding model and determine second embeddings for each topic in the taxonomy of topics, wherein the embedding model comprises a neural network architecture or an advanced transformer-based model, wherein the first embedding is a first numerical value representing a first location of the single string in the embedding model and the second embeddings are second numerical values representing locations of the each topic in the taxonomy, configured to cause the one or more servers to calculate similarity scores between the first embedding and the second embeddings, configured to use the similarity scores to identify the plurality of topics, and configured to further refine the plurality of topics into the retained classified topics using a machine learning model that classifies each of the plurality of topics as having either a low, a middle or the high level of relevance, wherein the machine learning model comprises a processing unit, a memory and a neural network that comprises interconnected nodes organized in layers.

2. The online education platform of claim 1, wherein the activity is a class.

3. The online education platform of claim 1, wherein the activity is a video.

4. The online education platform of claim 1, wherein the similarity score is a cosine similarity score.

5. The online education platform of claim 1, wherein the machine learning model is an artificial intelligence model.

6. The online education platform of claim 1, wherein the machine learning model is a Generative Pre-trained Transformer (GPT) model.

7. The online education platform of claim 1, wherein the low, the middle and the high level of relevance comprise "Definitely Not Relevant," "Not Sure" and "Definitely Relevant" respectively.

8. The online education platform of claim 7, wherein the web interface classifies each of the retained classified topics determined to have a high level of relevance as being either a bad, a weak or the strong match based at least in part on the text and relation to the activity.

9. An online education platform for tagging and storing activities, comprising:

a tagged activities database comprising a plurality of activities with each activity tagged with one or more topics;

a topics taxonomy database that stores a taxonomy of topics;

one or more servers configured to:

remove low value words from a text, standardize the text into a desired format, combine words and/or phrases into a single string, access an embedding model to calculate a similarity score between an embedding for the single string and an embedding for each topic in the taxonomy, select a plurality of topics in the taxonomy database with the highest similarity score, using a machine learning model to retain classified topics determined to have a high level of relevance from the plurality of topics in the taxonomy database with the highest similarity score, and tag an activity with each of the retained classified topics classified as having a strong match;

a tokenizer configured to tokenize the text into the words and/or phrases;

a web interface configured to interface with web devices of a plurality of users and receive the activity and the text from one of the plurality of users; wherein the machine learning model comprises a processing unit, a memory and a neural network that comprises interconnected nodes organized in layers, configured for classifying each of the selected plurality of topics as having either a low, a middle or the high level of relevance, classifying each of the retained classified topics determined to have a high level of relevance as being either a bad, a weak or the strong match based at least in part on a text and relation to the activity; and the embedding model is configured for embedding the single string and embedding each topic in a taxonomy, wherein the embedding model comprises a neural network architecture or an advanced transformer-based model.

10. The online education platform of claim 9, wherein the activity is a class.

11. The online education platform of claim 9, wherein the activity is a video.

12. The online education platform of claim 9, wherein the similarity score is a cosine similarity score.

13. The online education platform of claim 9, wherein the machine learning model is an artificial intelligence model.

14. The online education platform of claim 9, wherein the machine learning model is a Generative Pre-trained Transformer (GPT) model.

15. The online education platform of claim 9, wherein the low, the middle and the high level of relevance comprise "Definitely Not Relevant," "Not Sure" and "Definitely Relevant" respectively.

16. The online education platform of claim 15, wherein the bad, the weak and the strong match comprise "Bad Match," "Weak Match" and "Strong Match" respectively.

17. A method for tagging an educational activity with one or more topics, comprising:

receiving a text that corresponds to the educational activity;

removing low value words from the text;

standardizing the text into a desired format;

tokenizing the text into words and/or phrases;

combining the tokenized words and phrases into a single string;

generating an embedding for the single string using an embedding model, wherein the embedding model comprises a neural network architecture or an advanced transformer-based model;

generating an embedding for each topic in a taxonomy of topics;

calculating a cosine similarity score between the embedding for the single string and the embedding for each topic in the taxonomy;

selecting a plurality of topics in the taxonomy that have the highest cosine similarity scores with the single string;

classifying each topic in the selected plurality of topics using an artificial intelligence (AI) model as "Definitely Not Relevant", "Not Sure", and "Definitely Relevant", wherein the AI model comprises a processing unit, a memory and a neural network that comprises interconnected nodes organized in layers;

retaining the classified topics that are determined to be "Definitely Relevant";

classifying each of the retained topics using an artificial intelligence model as "Bad Match", "Weak Match" and "Strong Match" based on at least part of the text and relation to the educational activity; and applying the retained topics classified as "Strong Match" as the one or more tags for the educational activity.

18. The method of claim 17, wherein the text comprises a title of the activity, a description of the activity and one or more learning objectives of the activity.

19. The method of claim 17, wherein the educational activity is a class.

20. The method of claim 17, wherein the education activity is a video.

* * * * *